United States Patent [19]

Ohtake et al.

[11] 4,344,094
[45] Aug. 10, 1982

[54] METHOD AND APPARATUS DETECTING AND SETTING OPTIMUM TAPE RECORDING BIAS

[75] Inventors: Yasushi Ohtake; Tsunao Hasegawa, both of Tokorozawa, Japan

[73] Assignee: Pioneer Electronic Corporation, Tokyo, Japan

[21] Appl. No.: 96,265

[22] Filed: Nov. 21, 1979

[30] Foreign Application Priority Data

Nov. 24, 1978 [JP] Japan .................... 53-145059

[51] Int. Cl.³ ................... G11B 5/47; G11B 27/36
[52] U.S. Cl. ................................. 360/66; 360/31
[58] Field of Search .................... 360/66, 31, 25

[56] References Cited
U.S. PATENT DOCUMENTS 2,791,640 5/1957 Wolfe ........................ 360/31
4,011,585 3/1977 Sunaga ..................... 360/25
4,092,678 5/1978 Nishikawa ................ 360/31

OTHER PUBLICATIONS

Published Int. Application WO 79/00715, 10/79.

*Primary Examiner*—Vincent P. Canney
*Attorney, Agent, or Firm*—Sughrue, Mion, Zinn, Macpeak & Seas

[57] ABSTRACT

A method and an apparatus for detecting and automatically setting optimum recording bias in a tape recorder in which first and second test signals of low and high audio frequencies, respectively, are alternately recorded on a recording medium. While these are being recorded, the recording bias applied to the recording medium is varied in a plurality of steps between upper and lower limits. The tape is then rewound and the reproduced first and second signals are compared to determine at which recording bias step the reproduced levels of the first and second signals are equal to one another. The recording bias for normal recording is then set in accordance with the bias level present at the selected step.

8 Claims, 8 Drawing Figures

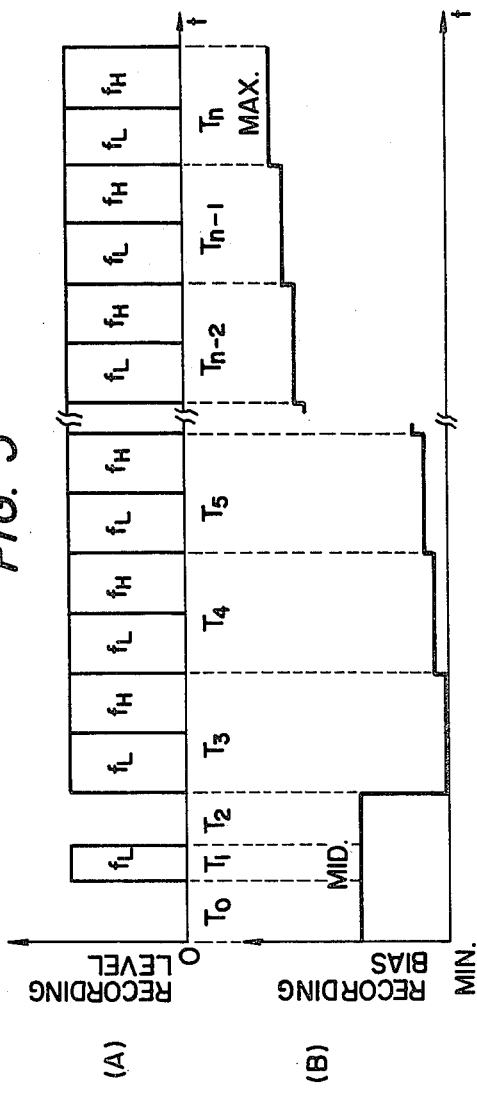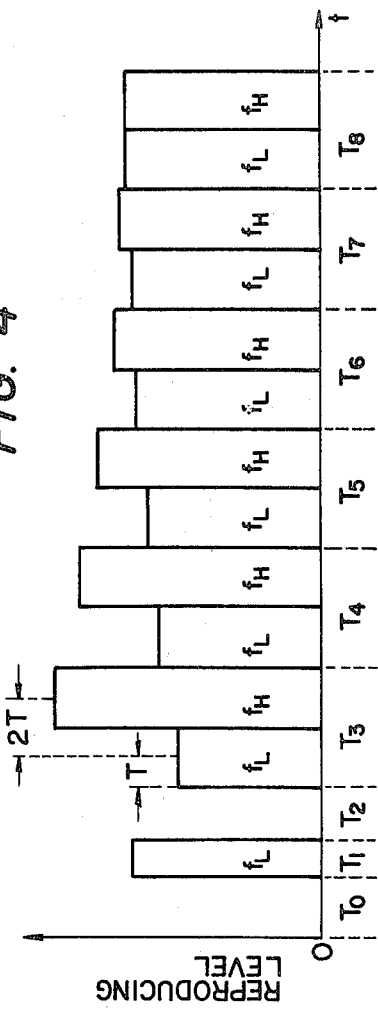

METHOD AND APPARATUS DETECTING AND SETTING OPTIMUM TAPE RECORDING BIAS

BACKGROUND OF THE INVENTION

The present invention relates to methods for detecting an optimum recording bias in a magnetic recording and reproducing device. More particularly, the invention relates to a method for automatically detecting the optimum value of a recording bias in a two-head system tape recorder.

In a tape recorder, selection of the optimum recording bias is essential because the frequency characteristics and the harmonic distortion of a recording are greatly affected by the recording bias current value. It is necessary to provide different optimum recording biases for different types of magnetic tapes. Furthermore, since even magnetic tapes of the same type have different recording and reproducing sensitivities, it is difficult to make the frequency characteristics flat for all magnetic tapes.

Accordingly, an object of this invention is to provide a method for detecting an optimum recording bias in two-head system tape recorder in which the recording bias is automatically adjusted so that a flat frequency characteristic is provided for tapes of various types.

SUMMARY OF THE INVENTION

In accordance with this and other objects of the invention, there is provided a method and apparatus for setting optimum bias recording levels in a magnetic recording and reproducing device. A plurality of test signals of predetermined levels are recorded on a recording medium. Simultaneously, the recording bias applied to the recording medium is varied. Next, the tape is rewound and the test signals reproduced. The reproduced test signals are compared to determine when a predetermined level relationship exists among at least selected ones of the reproduced test signals.

Yet further in accordance with the objects of the invention, there is provided a method and apparatus for detecting and setting optimum recording bias in a magnetic recording and reproducing device in which first and second test signals having the same level are recorded on a recording medium. In the preferred embodiments, this is done alternately, that is, the first and second test signals are alternated with one another along the length of a portion of the recording medium. While the first and second test signals are being recorded, the recording bias applied to the recording medium is varied in a plurality of steps between upper and lower limits. The tape is next rewound and the recorded test signals reproduced. As the test signals are reproduced, the first and second signals are compared and a determination made as to which recording bias step level the reproduced levels of the first and second signals are substantially equal to each other. The recording bias level for normal recording operations can then be set in accordance with that bias step level. Preferably, the first test signal is an audio signal in the lower portions of the audio range while the second test signal is an audio signal in the upper part of the audio range.

At one preferred embodiment, digital values corresponding to the various recording bias levels are produced while the test signals are being recorded. The recording bias is then varied in response to these digital values. Upon reproduction, at least one of the levels of the reproduced signals is stored and a comparison made between the stored value and the other one of the reproduced test signals. A digital value is then produced in response to the comparison representing the bias level step at which the first and second reproduced test signals are substantially equal to one another. The recording bias level is then set for normal recording operations in accordance with this digital value.

BRIEF DESCRIPTION OF THE DRAWINGS

FIGS. 3 and 4 are diagrams used for a description of the operation of the circuit shown in FIG. 1.

DESCRIPTION OF THE PREFERRED EMBODIMENTS

Figure 1:
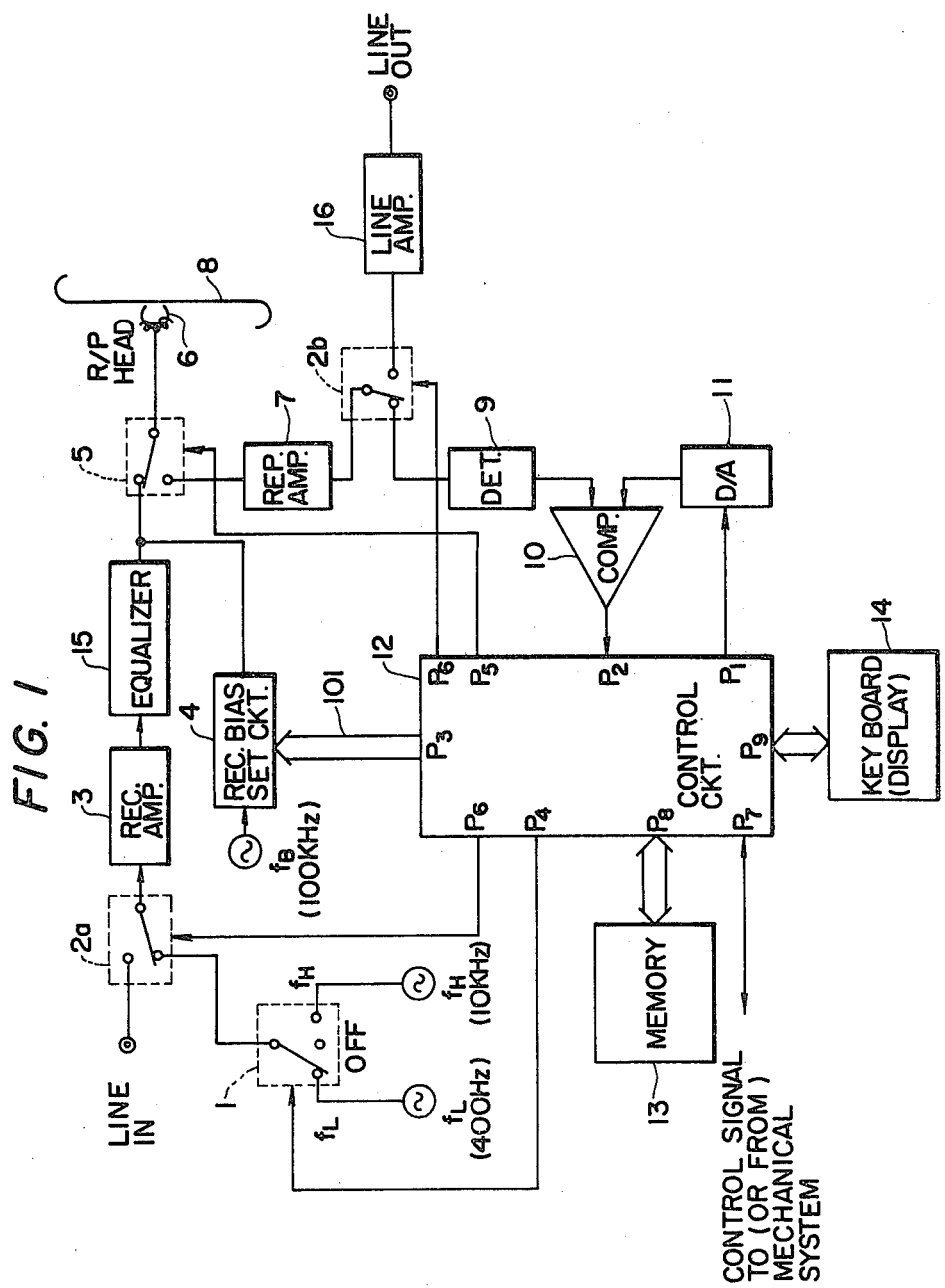
FIG. 1 is a schematic block diagram showing a preferred embodiment of an automatic bias setting circuit of the invention.

This invention will be described with reference to the accompanying drawings. FIG. 1 is a schematic block diagram showing a preferred embodiment of the invention. Two signals for recording adjustment characteristics, namely, a low frequency signal fL (for example, 400 Hz) and a high frequency signal fH (for example, 10 KHz) are selectively applied to one input terminal of a line switch 2a by means of a change-over switch 1. The line switch 2a selects either the adjustment signal or a line input signal and the signal thus selected is applied to a recording amplifier 3 and to an equalizer circuit 15.

Further, a recording bias signal fB (for example, 100 KHz) is superposed on the recording signal output of the equalizer circuit 15 by means of a bias setting circuit 4 provided to vary the recording bias level and the resultant signal is applied to a recording and reproducing switch 5. This switch 5 operates to supply a recording signal to a recording playback (R/P) head 6 in the recording operation and to supply a reproducing signal from the R/P head 6 to a reproducing amplifier 7. In FIG. 1, reference numeral 8 designates a magnetic tape.

The output of the reproducing amplifier 7 is applied to a line amplifier 16 or a detector circuit 9 selectively by a line switch 2b. In the detector circuit 9, the amplified reproducing signal is converted into a signal with a DC level which is applied as one input to a comparator 10. Applied to the other input of the comparator 10 is the output of a digital-to-analog (D/A) converter 11 which converts into a DC level a digital signal which is provided through an output port $P_1$ of a control circuit 12, such as a microprocessor, which is provided for controlling the tape recorder. The output of the comparator 10 is applied to an input port $P_2$ of the control circuit 12. An output $P_3$ port of the control circuit provides a binary digital signal 101 to control the recording bias setting circuit 4.

The change-over switches 1 and 5 and the line switches 2a and 2b are controlled by output port $P_4$, $P_5$ and $P_6$, respectively. An input/output port $P_7$ of the control circuit acts as an input/output line for a control signal adapted to control the mechanical system of the tape recorder and for a control signal delivered from the mechanical system.

Furthermore, a memory circuit 13 is provided which includes a read-only memory (ROM) in which programs for controlling the operation of the control circuit having a central processing unit (CPU) have been stored in advance and a random access memory (RAM) in which writing and reading data necessary for operation can be freely stored and retrieved. A bus line (or an input/output port) $P_8$ for binary digital signals is connected between the memory circuit 13 and the control circuit 12. A key board 14 for issuing external instructions is connected to an input/output port $P_9$ of the control circuit. The key board 14 may be provided with a display unit if desired so that the operating conditions of the control circuit can be monitored.

The RAM in the memory 13 is maintained in an energized state by the power source of the device. However, should the power source be interrupted, a predetermined voltage is applied to the power input of the RAM from a back-up power source such as a battery so that the contents stored in the RAM will not be lost.

Figure 2A:
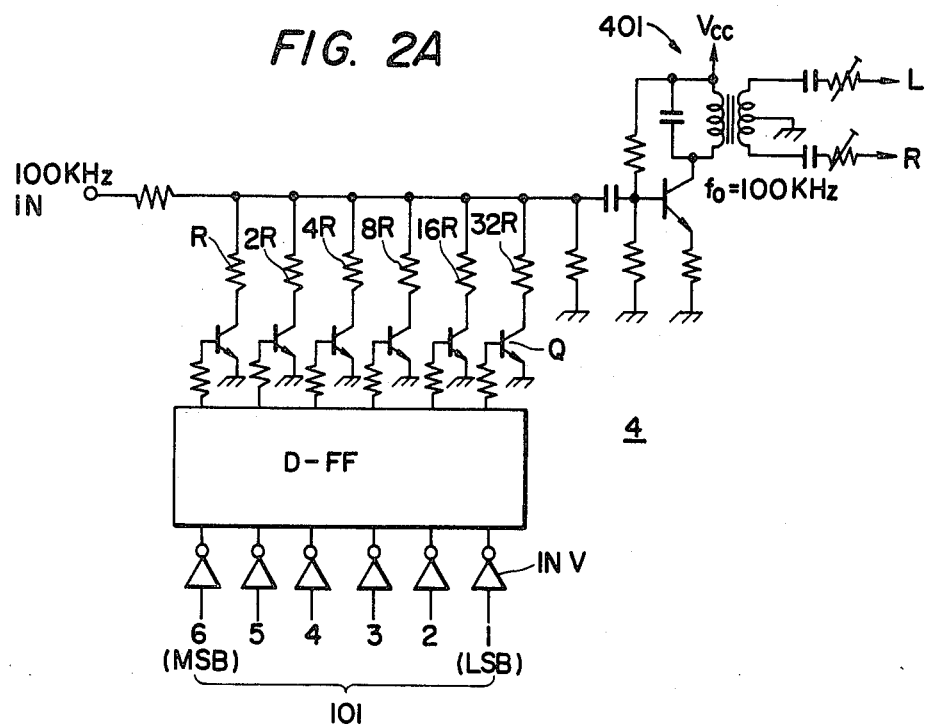
FIG. 2A is a circuit diagram, partly as a block diagram, showing an example of a recording bias setting circuit.
Figure 2B:
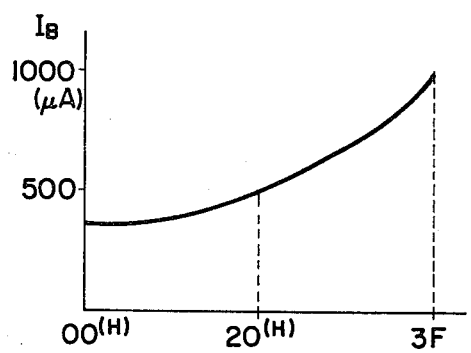
FIG. 2B is a graphical representation indicating characteristics of the recording bias setting circuit.

A specific example of the recording bias setting circuit 4 is shown in FIG. 2A. The circuit 4 is adapted to vary the resistance between the bias signal line and ground in response to the 6-bit parallel digital control signal 101 from the control circuit 12. To implement this function, the circuit 4 includes switching transistors Q, a resistor net-work (R, 2R, 4R, . . . and 32R), a set of six D-type flip-flops D- FF, and inverters INV. In FIG. 2A, reference numeral 401 designates a bias amplifier adapted to amplify the 100 KHz signal. FIG. 2B is a graph which indicates variations of the bias signal current $I_B$ with respect the control signal 101.

The value of the 6-bit control signal 101 is digitally expressed in a sixty-four steps from a minimum value 00 to a maximum value 3F (in hexadecimal notation). The hexadecimal value "00" indicates "step 0" for the control signal 101 state of "0 0 0 0 0 0", the value 3F indicates "step 63" for a control signal state of "1 1 1 1 1 1", and the value 20 indicates an intermediate value of "step 32" for a control signal state of "1 0 0 0 0 0".

Thus, the recording bias can be changed stepwise in 64 steps by the 6-bit control signal. Accordingly, if the number of bits forming the control signal is increased, then the range of variation of the recording bias is correspondingly increased and therefore the resolution is also increased.

The operation of the magnetic recording and reproducing device according to the invention will further be described with reference to FIGS. 3 and 4. Upon depression of the "START" button (not shown) on the key board 14, a start signal which initiates automatic adjustment is applied from the key board to the control circuit. In response to the start signal, operation starts in accordance with a procedure which is indicated by a program stored in the ROM of the memory 15.

First, the switches 2a and 2b are operated by the output port $P_6$ of the control circuit 12 as result of which a line input inhibiting condition is established while the recording condition of the mechanical system is set up by the output port $P_7$. A signal corresponding to the control signal 101 which has been stored in the RAM is read out to control the recording bias setting circuit 4 whereby a standard bias condition is established. The term "standard condition" as herein used is intended to mean the case when the recording bias control signal 101 is a signal of hexadecimal value 20 corresponding to the intermediate step in the permissible range thereof. The select switch 1 is set to the OFF position by the control circuit 12 while simultaneously the device is placed in the recording condition.

FIGS. 3A and 3B are bar graphs which indicate signal levels and recording bias levels respectively, with respect to time for the recording operation. First, during the period $T_0$, recording is performed with no signal. Thereafter, the switch 1 is operated so that the low frequency signal fL is recorded for the period $T_1$. Then, the switch 1 is again set to the "OFF" position and recording with no signal is again performed for the period $T_2$. During each of these periods $T_0$, $T_1$ and $T_2$, recording is effected with the control signal 101 to the recording bias setting circuit 4 held at the intermediate step 20 value of hexadecimal.

During the following period $T_3$, the control circuit 12 operates the change-over switch 1 so that the control signal 101 assumes a value of hexadecimal 00, that is the bias is set to a minimum and the low frequency signal fL and the high frequency signal fH are recorded in the first half (2T) and the second half (2T) thereof, respectively. In the next period $T_4$, the control signal is increased by one step from hexadecimal 00 to hexadecimal 01 to thereby increase the bias whereby the signals fL and fH are recorded in the first and second halves of the period, respectively.

Similar to the above-described cases, the control signal is increased by one step successively to vary the bias and the signals fL and fH are recorded in the first half and the second half of each period (Tn), respectively. This mode of recording ends in the period (Tn) when the sixty-fourth step occurs when the bias is at a maximum. The mechanical system is afterwards placed in the rewinding state by the control signal $P_7$ and the magnetic tape is rewound to the no signal recording start position ($T_0$). A digital value representing this position can be stored by the internal memory of the control circuit 12 or by the external memory 13.

Thereafter, the mechanical system is controlled so as to set it to the reproducing condition and the recording and reproducing control switch 5 is set to the reproducing side. As a result, the digital signal minimum value of hexadecimal 00 for instance is outputted through the output port $P_1$ as a result of which the minimum DC level signal is applied by the D/A converter 11 to the reference input of the comparator 10. Accordingly, in the period $T_1$ following the period $T_0$, the output of the comparator 10 is inverted whereby the rise of the reproducing signal fL is sensed and the standby state is established for the period $T_1 + T_2 + T$ where T is a period substantially equal to a half of the recording period and is approximately $T_3/4$. Alternatively, the standby state may be established for the period $T_2 + T$ by sensing the fall of the reproducing signal fL at the output of the comparator 10. After the elapse of the relevant period, the reproducing level of the signal fL is subjected to analog-to-digital conversion by a so-called "successive comparison type A/D converter" made up of the comparator 10 and the D/A converter 11 and the resulting digital signal is temporarily stored. Thereafter, the standby operation is effected for the period 2T while the reproducing level of the high frequency signal fH is subjected to analog-to-digital conversion whereby the resulting signal is compared with the reproducing level of the low frequency signal fL which has been previously stored.

This reproducing level comparison operation is repeatedly carried out until the two reproducing levels become equal to each other. In the case of FIG. 4, the comparison operation is carried out until the period $T_8$ when it is determined that the two levels have become equal and the optimum recording bias has been arrived at. With respect to determination of the optimum recording bias, since the value obtained by counting the number of comparison operations in the reproducing operation until equality of levels is reached is the number of steps in variation of the bias, it is evident that the recording bias can be set in accordance with the count value.

The recording bias thus set can be stored in the RAM by depressing a predetermined switch on the keyboard 14, or the proper bias level can be read out by a display device. Then following this, the mechanical system is placed in the rewinding state to rewind the tape to the initial position at which the time adjustment operation has been accomplished.

In the above-described example, the recording bias is successively increased or varied from the minimum step value to the maximum step value. However, the order of variation is not limited thereto or thereby. That is, the recording bias may be varied suitably in the range of from the minimum step to the maximum step. Furthermore, in the above-described example, the steps of the recording bias occur at equal intervals (4T) and the signals fL and fH are recorded in the first and second halves, each being 2T, in each step. However, the invention is not limited thereto or thereby.

Furthermore, in the example described above, the timing for the comparison operation is at exactly half of the recording period of the signal fL or fH. It goes without saying that the timing may be selected as desired. In addition, it is obvious that the recording pattern for the initial part of the period $T_0$ through $T_2$ may be suitably changed. That is, the specific feature of the invention resides in that while the recording bias is being successively varied in a plurality of steps between the upper limit and the lower limit, the first signal fL and the second signal fH having the same level are recorded for each step and while reproduction is being effected beginning with the first step of the recording bias, the reproducing levels corresponding to the first and second signals are subjected to comparison at each step so that when the two levels become equal to each other the recording bias will be at the optimum recording bias.

As is apparent from the above description, according to the invention, for different magnetic tape types, the optimum recording bias is automatically detected and set in an extremely short time in a relatively simple operation as a result of which flat frequency characteristics are obtained.

The employment of a microprocessor such as a microcomputer as the control circuit makes the device small in size and high in reliability.

What is claimed is:

1. A method for detecting and setting optimum recording bias levels in a magnetic recording and reproducing device comprising the steps of:
    recording a plurality of test signals of predetermined levels on a recording medium with a variable recording bias applied to said test signals;
    varying said recording bias applied to said recording medium while said test signals are being recorded;
    reproducing said test signals once; and
    comparing the reproduced test signals with each other to determine when a predetermined level relationship exists among said reproduced test signals.

2. A method for detecting and setting optimum recording bias in a magnetic recording and reproducing device comprising the steps of:
    recording first and second test signals at the same level on a recording medium;
    successively varying recording bias applied to said recording medium in a plurality of steps between an upper limit and a lower limit while said first and second test signals are being recorded;
    reproducing said signals once; and
    comparing the reproduced first and second signals with each other to determine at which recording bias step the levels of said reproduced first and second signals are substantially equal to each other.

3. The method of claim 2 further comprising the step of setting a recording bias level in accordance with said recording bias step at which said levels of said reproduced first and second signals are substantially equal to each other.

4. The method of claim 3 wherein said first test signal is a relatively low audio range signal of constant frequency and said second test signal is a relatively high audio range signal of constant frequency.

5. A method for detecting and setting optimum recording bias in a magnetic recording and reproducing device comprising the steps of:
    alternately recording first and second test signals at the same level on a recording medium;
    producing a sequence of digital values representing corresponding recording bias levels while said test signals are being recorded;
    producing recording bias in response to said digital values;
    reproducing the recorded test signals;
    determining the levels of the reproduced test signals;
    storing a value representing at least one of said levels of said reproduced test signals;
    comparing the levels of said first and second reproduced test signals in succession;
    producing a digital value in response to said comparing means corresponding to a bias level step at which said first and second reproduced test signals are substantially equal; and
    setting a recording bias level in response to said digital value.

6. Apparatus for detecting and setting optimum recording bias levels and a magnetic recording and reproducing device comprising:
    means for recording a plurality of test signals of predetermined levels on a recording medium;
    means for varying recording bias applied to said recording medium while said test signals are being recorded;
    means for reproducing said test signals; and means for comparing the reproduced test signals in a single reproduction period with each other to determine when a predetermined level relationship exists among said reproduced test signals.

7. Apparatus for detecting and setting optimum recording bias in a magnetic recording and a reproducing device comprising:
    means for recording first and second test signals at the same level on a recording medium;
    means for successively varying recording bias applied to said recording medium in a plurality of steps between an upper limit and a lower limit while said first and second test signals are being recorded;

means for reproducing said signals; and means for comparing the reproduced first and second signals in a single reproduction period with each other to determine at which recording bias step the levels of said reproduced first and second signals are substantially equal to each other.

8. The method of claim 7 wherein said first test signal is a relatively low audio range signal of constant frequency and said second test signal is a relatively high audio range signal of constant frequency.

* * * * *